United States Patent [19]

Maruhashi et al.

[11] Patent Number: 4,913,945
[45] Date of Patent: Apr. 3, 1990

[54] PROCESS FOR BLOW-MOLDING AND HEAT SETTING OF POLYESTER HOLLOW FORMED BODY

[75] Inventors: Yoshitsugu Maruhashi; Setsuko Iida; Takashi Sugisaki, all of Yokohama; Yohji Mizutani; Nobuhiro Kishida, both of Tokyo, all of Japan

[73] Assignee: Toyo Seikan Kaisha, Ltd., Tokyo, Japan

[21] Appl. No.: 256,951

[22] Filed: Oct. 13, 1988

Related U.S. Application Data

[62] Division of Ser. No. 91,137, Aug. 31, 1988, Pat. No. 4,803,036.

[30] Foreign Application Priority Data

Aug. 30, 1986 [JP] Japan .................................. 61-202640

[51] Int. Cl.$^4$ .......................... B65D 1/02; B29C 49/08
[52] U.S. Cl. .................................. 428/36.92; 215/1 C; 264/521; 428/212; 428/480
[58] Field of Search ...................... 264/521; 428/36.92, 428/480, 212; 215/1 C

[56] References Cited

U.S. PATENT DOCUMENTS

| | | | |
|---|---|---|---|
| 4,233,022 | 11/1980 | Brady et al. | 264/520 |
| 4,512,448 | 4/1985 | Jabarin | 264/521 |
| 4,755,404 | 7/1988 | Collette | 428/36.92 |

Primary Examiner—James Seidleck
Attorney, Agent, or Firm—Sughrue, Mion, Zinn, MacPeak & Seas

[57] ABSTRACT

Disclosed is a process for the preparation of a heat-resistant polyester hollow formed body, which comprises mounting a preform of a thermoplastic polyester composed mainly of ethylene terephthalate units, which is maintained at a temperature where high-speed drawing is possible but whitening can be prevented, especially at a temperature represented by the following formula:

$$T = K(100 \cdot IV - 8 \cdot DEG + 42) \quad (1)$$

wherein IV stands for the intrinsic viscosity (dl/g) of the thermoplastic polyester, DEG stands for the content (% by weight) of diethylene glycol units in the thermoplastic polyester, k is a number of from 0.95 to 1.05, and T stands for the temperature (°C.) of the preform, in a hollow forming mold maintained at a temperature as high as possible within the range where a final hollow formed body can be withdrawn without deformation substantially under non-cooling, blowing air maintained at a temperature higher than the preform temperature into the preform to effect stretch drawing and expansion drawing so that the drawing speed in the axial direction is at least 250%/sec and the drawing speed in the circumferential direction is at least 450%/sec, and effecting heat setting while the preform is being draw-formed.

According to this process, a polyester hollow formed vessel excellent in the resistance to thermal contraction can be prepared at a very high manufacturing speed.

5 Claims, 5 Drawing Sheets

PROCESS FOR BLOW-MOLDING AND HEAT SETTING OF POLYESTER HOLLOW FORMED BODY

This is a division of application Ser. No. 091,137, filed Aug. 31, 1988, now U.S. Pat. No. 4,803,036.

BACKGROUND OF THE INVENTION (1) Field of the Invention

The present invention relates to a process for the preparation of a polyester hollow formed body and also to a vessel prepared according to this process. More particularly, the present invention relates to a process in which simultaneously with draw-blow-forming of a polyester preform to a hollow formed body, heat setting of the molecular orientation can be performed efficiently. Furthermore, the present invention relates to a polyester vessel having novel molecular orientation characteristics and being excellent in resistance to contraction.

(2) Description of the Prior Art

A biaxially draw-blow-formed vessel of a thermoplastic polyester such as polyethylene terephthalate has not only excellent transparency and surface gloss but also impact resistance, rigidity and gas-barrier properties required for bottles, and therefore, this vessel has been used for bottling various liquids.

However, polyester vessels are generally defective in that the heat resistance is poor, and when contents are hot-filled, thermal deformation or contraction of the volume is readily caused. Accordingly, many methods for heat-setting biaxially draw-blow-formed vessels after the forming operation have been proposed as means for eliminating this disadvantage.

As heat-setting methods, there are known, for example, a method in which a formed body obtained by draw-blow-forming is taken out from a draw-blowing mold and then held in a heat-setting mold and the formed body is heat-set, as disclosed in Japanese Patent Publication No. 56606/85, and a method in which heat setting is carried out simultaneously with draw-blow-forming in a blow-forming mold, as disclosed in Japanese Patent Publication No. 6216/84. Furthermore, Japanese Patent Application Laid-Open No. 53326/82 teaches a method in which a heat treatment is carried out simultaneously with draw-blow-forming in a primary mold and the formed body is taken out from the primary mold and blow-formed in a secondary mold directly without cooling.

Of the foregoing known methods, the method in which heat setting is carried out simultaneously with draw-blow-forming in a blow-forming mold is industrially excellent because the number of steps is small and the apparatus cost is low. However, the method is still insufficient in that the manufacturing speed is low because a relatively long residence time in the mold is necessary for heat setting after the draw-blowing operation and cooling for withdrawal of a hollow formed body.

As means for overcoming this disadvantage, there has been proposed a method in which the hollow-forming mold is maintained at a temperature as high as possible within a range where the final hollow formed body can be taken out without deformation substantially under non-cooling, for example, at 100° C., and a polyester preform is biaxially drawn simultaneously with blowing of high-temperature high-pressure air in the polyester preform (see Japanese Patent Application Laid-Open No. 95666/79). According to this method, it becomes unnecessary to elevate and drop the temperature of the mold, but in case of conduction of heat from the high-temperature gas, because of the presence of the heat transfer boundary film, a relatively long time is still necessary for completion of heat setting and the resistance to thermal contraction is not satisfactory.

In the process for the preparation of a hollow formed body in which draw-blow-forming and heat setting of the molecular orientation are simultaneously carried out, it is expected that if a preform being draw-formed is maintained at a temperature as high as possible, heat setting will be possible while the preform is being draw-formed and the residence time of the hollow formed body in the mold will be drastically shortened. However, preheating of an amorphous preform at a high temperature results in occurrence of troubles such as thermal deformation of the preform and thickness unevenness at the draw-forming step. Moreover, whitening and reduction of the drawability are caused by thermal crystallization of the polyester. Therefore, this means cannot be practically adopted.

SUMMARY OF THE INVENTION

It is therefore a primary object of the present invention to solve the above-mentioned problems in the process for the preparation of a polyester hollow formed body in which heat setting is carried out simultaneously with draw-blow-forming and provide a process in which by maintaining a polyester in a mold at a high temperature, heat setting is advanced simultaneously with draw-forming and therefore, a polyester hollow formed body excellent in the resistance to thermal contraction can be prepared at a high manufacturing speed.

This process is further advantageous in that the contraction of the formed body with the lapse of time during the storage in a warehouse or the like can be reduced.

We found that by maintaining a hollow-forming mold, a polyester preform and air to be blown into the preform at predetermined levels, respectively, and adopting a certain high speed for drawing the preform, the temperature of the preform being draw-formed becomes higher than the temperature of heat by internal friction or the temperature of heat by crystallization, and draw-forming and heat setting are simultaneously advanced and a hollow formed body excellent in the resistance to contraction is obtained at a high manufacturing speed. It also was found that a vessel obtained according to this process has novel orientation characteristics in the shoulder portion where the contraction tendency is largest and the vessel is especially excellent in the resistance to contraction.

More specifically, in accordance with the present invention, there is provided a process for the preparation of a heat-resistant polyester hollow formed body, which comprises mounting a preform of a thermoplastic polyester composed mainly of ethylene terephthalate units, which is maintained at a temperature where high-speed drawing is possible but whitening can be prevented, especially at a temperature represented by the following formula:

$$T = k(100 \cdot IV - 8 \cdot DEG + 42) \tag{1}$$

wherein IV stands for the intrinsic viscosity (dl/g) of the thermoplastic polyester, DEG stands for the content (% by weight) of diethylene glycol units in the thermoplastic polyester, k is a number of from 0.95 to 1.05, and T stands for the temperature (°C.) of the preform, in a hollow forming mold maintained at a temperature as high as possible within the range where a final hollow formed body can be withdrawn without deformation substantially under non-cooling, blowing air maintained at a temperature higher than the preform temperature into the preform to effect stretch drawing and expansion drawing so that the drawing speed in the axial direction is at least 250%/sec and the drawing speed in the circumferential direction is at least 450%/sec, and effecting heat setting while the preform is being draw-formed.

Furthermore, in accordance with the present invention, there is provided a vessel comprising a neck, a shoulder, a barrel and a closed bottom, which is obtained by draw-blow-forming a preform of a thermoplastic polyester composed mainly of ethylene terephthalate units and heat-setting the orientation, wherein the center of the shoulder of the vessel has a crystallization degree of at least 28% as measured by the density method, the refractive index (nxo) in the thickness direction of the outer face side of the center of shoulder, measured by using NaD rays, is larger than the refractive index (nxi) in the thickness direction of the inner face side of the center of the shoulder, measured by using NaD rays, and there is formed such a molecule orientation distribution that the orientation degree ratio (Ro) defined by the following formula:

$$Ro = (na - nxo)/(na - nxi) \qquad (2)$$

wherein na is a refractive index of the unoriented polyester, which is equal to 1.5760 according to Polymer Handbook, the second edition, is less than 0.95.

DETAILED DESCRIPTION OF THE PREFERRED EMBODIMENTS

In the process where draw-blow-forming and heat setting are performed simultaneously (at one stage), in view of the resistance to conduction, it is preferred that the temperature of the hollow forming mold be as high as possible, and in view of the productivity or the withdrawal of a hollow formed body, it is preferred that the temperature of the hollow forming mold be low. In the present invention, by maintaining the hollow forming mold at a temperature as high as possible within the range where a final hollow formed body can be withdrawn without deformation substantially under non-cooling, no substantial cooling time becomes necessary in the forming cycle and the preparation of a hollow formed body can be performed at a high manufacturing speed. This temperature differs according to the kind of the polyester and the degrees of the molecular orientation and heat setting, but the temperature is generally 100° to 120° C. and preferably 106° to 115° C. The condition of "substantially under non-cooling" referred to in the instant specification is advantageously accomplished by substituting internal hot air with open air in withdrawing the hollow formed body from the mold. In this case, unintended cooling is caused to some extent, but this unintended cooling is included in this condition.

In the present invention, the preform is preliminarily heated at a temperature as high as possible within the range where thermal deformation of the preform and occurrence of thickness unevenness at the draw-forming step can be prevented. This temperature is given by the above-mentioned formula (1). This formula is an empirical formula obtained based on the fact that this thermal deformation temperature becomes high as the intrinsic viscosity (IV) of the polyester is increased and the thermal deformation temperature becomes low as the content (DEG) of diethylene glycol units in the polyester is increased. The coefficient of the right side of the formula (1) defining the preform temperature (T) defines the allowable range. If this coefficient k is larger than 1.05, occurrence of thickness unevenness in the preform cannot be prevented at the draw-blow-forming step and the preparation of a good hollow formed body becomes difficult. Furthermore, the preform is whitened by crystallization and the transparency of the formed body is degraded, resulting in reduction of the commercial value. On the other hand, if the coefficient k is smaller than 0.95, although draw-blow-forming is possible, the strain at the draw-blow-forming step is left in the formed body, and the resistance to contraction cannot be improved unless heat setting is conducted for a relatively long time.

In the present invention, by blowing hot air maintained at a temperature higher than the preform temperature into the preform, expansion drawing in the circumferential direction is accomplished simultaneously with stretch drawing in the axial direction by a drawing rod. The present invention is prominently characterized in that at this draw-blow-forming step, the drawing speed in the axial direction is at least 250%/sec, especially at least 300%/sec, and the drawing speed in the circumferential direction is at least 450%/sec, especially 500%/sec, that is, drawing is performed at a very high speed.

Under the preparation conditions of the present invention, the preform temperature is relatively high and hot air maintained at a temperature higher than the preform temperature is compressed in the interior of the preform. Even under such high temperature conditions, by drawing the preform at a high speed, effective molecular orientation is produced. What is most important is that spontaneous heat generation, which is deemed to be due to internal friction of the polyester and crystallization, is caused at the above-mentioned high-speed draw-blowing, and the temperature of the preform being draw-blow-formed is further elevated and relaxation of the strain and crystallization are promoted.

Figure 1:
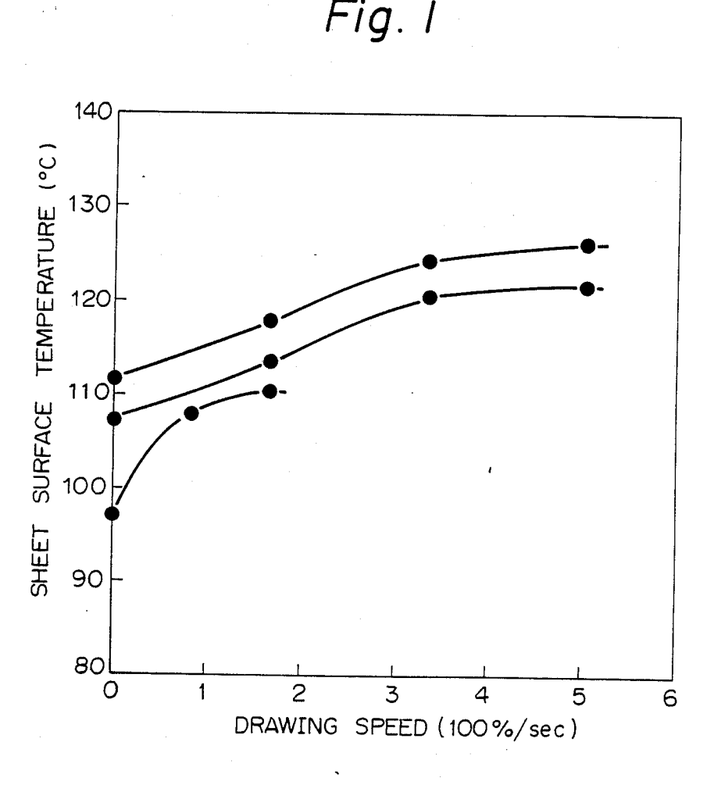
FIG. 1 illustrates thee relation between the highest arrival sheet temperature and the drawing speed when a polyethylene terephthalate sheet having a thickness of 2 mm is simultaneously biaxially drawn.

In FIG. 1 of the accompanying drawings, the relation between the drawing speed and the elevation of the temperature by generation of heat which is deemed to be due to the internal friction and crystallization is plotted while the temperature of polyethylene terephthalate is changed. From the results shown in FIG. 1, it is understood that with increase of the drawing speed, the degree of elevation of the temperature is increased, and as the original temperature is low, the degree of elevation of the temperature is large.

In order to increase the absolute value of the temperature at which the preform arrives, it is preferred that the preheating temperature of the preform be maintained at an allowable high temperature defined by the formula (1) and the drawing speed be increased to further elevate the temperature. From this viewpoint, in the present invention, it is specified that the drawing speed in the axial direction is at least 250%/sec and the drawing speed in the circumferential direction is at least 450%/sec. This drawing speed is much higher than the drawing speed adopted in the conventional method, that is, the drawing speed of about 150%/sec in the axial direction and the drawing speed of about 200%/sec in the circumferential direction.

In the present invention, by utilizing elevation of the temperature, which is deemed to be due to internal friction or crystallization, for relaxation of the strain and promotion of the crystallization, draw-blow-forming and heat setting are simultaneously advanced and furthermore, drawing is performed at a high speed. Accordingly, the blowing time can be greatly shortened as compared with the blowing time in the conventional method.

A draw-blown heat-set polyester vessel obtained according to the above-mentioned preparation process was found to have a novel molecule orientation distribution.

Figure 2:
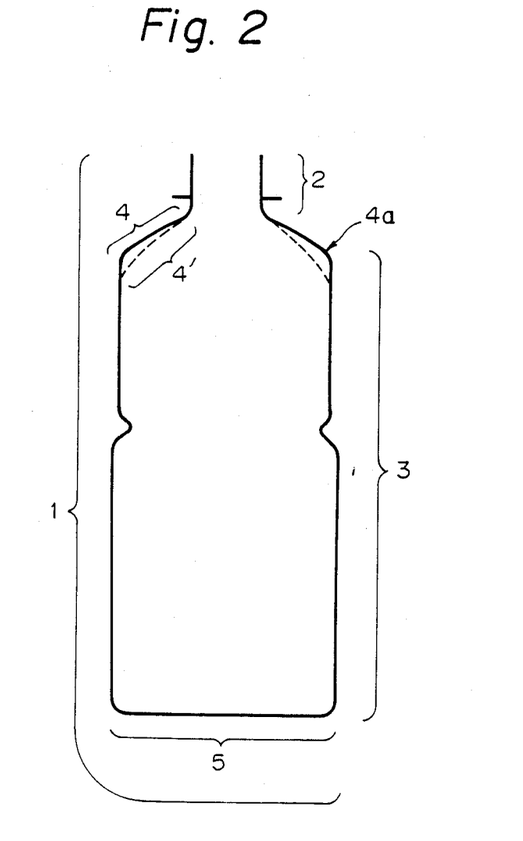
FIG. 2 is a sectional view of a bottle, which illustrates the change of the shape by thermal contraction.

Referring to FIG. 2 illustrating the sectional structure of an ordinary draw-blown heat-set polyester vessel, this vessel 1 comprises an unoriented thick neck 2, a highly oriented and crystallized thinnest barrel 3, an oriented and crystallized shoulder 4 connecting the neck to the barrel and a closed bottom 5.

When a content is hot-filled in the vessel 1 or the vessel 1 is stored in an empty state for a long time, the portion where contraction is most easily caused is the shoulder 4, and a contracted shoulder 4' shown by chain lines in FIG. 2 is formed as the result of contraction of the shoulder 4 in the circumferential direction. The novel characteristic feature of the biaxially draw-blown heat-set polyester vessel according to the present invention is that although the vessel is oriented and crystallized so that the center 4a of the shoulder 4 has a crystallization degree of at least 28%, especially at least 30%, as measured by the density method, there is formed such a molecule orientation distribution that the refractive index ($nxo$, NaD rays) in the thickness direction of the outer face side of the center of the shoulder is large than the refractive index ($nxi$, NaD rays) in the thickness direction of the inner face side of the center of the shoulder.

The refractive index referred to in the instant specification is one measured by using NaD rays as the light source, an Abbe refractometer as the refractometer and a polarizing plate and making light incident in parallel to the sample surface while regarding the polarization direction of the polarizing plate as the thickness direction. This method is advantageous in that the refractive index on the side falling in contact with a main prism can be selectively measured. Furthermore, refractive indexes of the sample in various directions can be measured by changing the polarization direction.

The refractive index ($nz$) in the height direction, the refractive index ($ny$) in the circumferential direction and the refractive index ($nx$) in the thickness direction, measured in the above-mentioned manner with respect to each plane of the polyester vessel wall, have certain relations, described below, to the molecular orientation. More specifically, supposing that the refractive index of the unoriented polyester is $na$, the orientation degree in the height direction is proportional to the value ($nz-na$) and the orientation degree in the circumferential direction is proportional to the value of ($ny-na$), while the in-plane orientation degree is proportional to the value of ($na-nx$).

At the step of draw-blow-forming the polyester preform, the inner face side of the vessel wall undergoes a higher molecular orientation than the outer face side. In the conventional heat-setting method, transfer of heat from the outer face side of the vessel wall, that is, transfer of heat from the mold, is preferentially caused, and orientation and crystallization by heat setting are caused from the outer face side. Accordingly, the orientation degree on the outer face side is substantially the same as the orientation degree on the inner face side. Practically, when the refractive index ($nxo$) on the outer face side and the refractive index ($nxi$) on the inner face side are measured with respect to the center of the shoulder of a known heat-set vessel, it is confirmed that there is no substantial difference between both the values. Furthermore, in this heat-set vessel, contraction of the shoulder as indicated by chain lines in FIG. 2 is caused.

According to the present invention, by performing draw-blow-forming and heat-setting under the above-mentioned strict temperature control under conditions causing spontaneous heat generation in the polyester preform being formed, at the center of the shoulder of the vessel there is formed such a molecule orientation distribution that the condition of the following inequality:

$$nxo < nxi \qquad (3)$$

is satisfied and the orientation degree ratio ($Ro$) defined by the formula (2) is less than 0.95, especially in the range of from 0.75 to 0.93, whereby contraction of the shoulder is prominently controlled.

It was found that when a polyester vessel is allowed to stand still for one day in an atmosphere maintained at a temperature of 30° C. and a relative humidity of 80% and is then subjected to the hot filling operation, the vessel has a much larger thermal contraction than the vessel which is not subjected to this hygroscopic treatment. It is deemed that the reason is that water absorbed in the polyester shows a plasticizing effect in the hot state and the orientation is relaxed.

Figure 3:
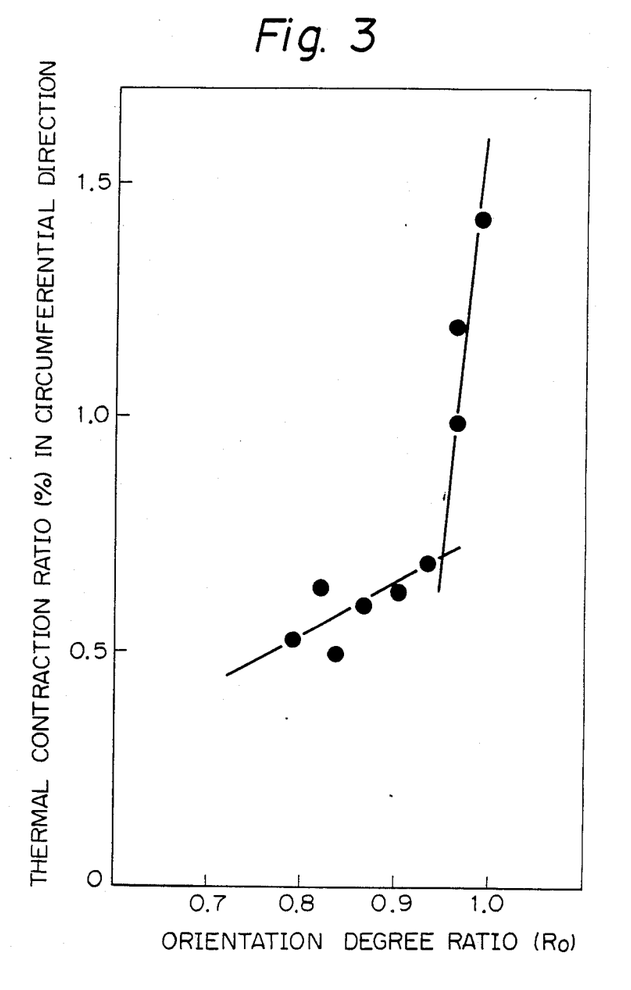
FIG. 3 illustrates the relation between the orientation degree ratio (Ro) in the vicinity of the center of the bottle and the thermal contraction ratio in the axial direction of the bottle.

FIG. 3 of the accompanying drawings illustrates the relation between the orientation degree ratio ($Ro$) and the thermal contraction after the above-mentioned hydroscopic treatment and filling of hot water at 88° C., which is plotted with respect to draw-blown heat-set vessels obtained under various heat-setting conditions while maintaining the crystallization degree of the center of the shoulder at a constant level of 32%. It is seen that in order to reduce the thermal contraction, it is critical that the orientation degree ratio ($Ro$) should be less than 0.95.

In the present invention, a thermoplastic polyester composed mainly of ethylene terephthalate units is used as the thermoplastic polyester. For example, there can be mentioned polyethylene terephthalate (PET) and so-called modified PET obtained by incorporating a small amount of other glycol such as hexahydroxylene glycol as the glycol component or a small amount of other dibasic acid such as isophthalic acid or hexahydrophthalic acid as the dibasic acid component. The polyester may be used singly or in the form of a blend with other resin such as a nylon, a polycarbonate or a polyacrylate.

It is preferred that the intrinsic viscosity of the thermoplastic resin used be at least 0.67 dl/g and the content of diethylene glycol units be lower than 2.0% by weight.

The bottomed preform used for draw-blow-forming can be prepared according to a known optional method, for example, the injection molding method or the pipe extrusion molding method. According to the former method, a molten polyester is injected and a bottomed preform having a mouth-neck portion, which corresponds to a final vessel, is prepared in the amorphous state. The latter method is advantageous for preparing a bottomed preform having an intermediate layer of a gas-barrier resin such as an ethylene/vinyl alcohol copolymer, and according to this latter method, an extruded amorphous pipe is cut, and a mouth-neck portion is formed on one end of the cut pipe by the compression molding while the other end is closed, whereby a bottomed preform is formed. In order to attain good engagement with a lid at a high temperature and maintain a good sealing state, only the portion to be formed into a mouth-neck portion can be heat-crystallized. Of course, this heat crystallization can be performed at any optional subsequent step.

Draw-blow-forming and heat setting of the preform can be performed under known conditions except the above-mentioned limitations. It is preferred that the temperature of hot air to be blown into the preform be higher by at least 10° C. than the preform temperature (T), and that the draw ratio in the axial direction be 1.3 to 3.5, especially 1.5 to 3, and the draw ratio in the circumferential direction be 2 to 5.5, especially 3 to 5, in the barrel.

After draw-blow-forming, hot air compressed into the formed body is substituted with air under atmospheric pressure, and the formed body is withdrawn from the mold. According to the present invention, the time necessary for draw-blow-forming is only 1 to 4 seconds and the time necessary for gas substitution is only 1 to 4 seconds, and the residence time of the formed body in the mold can be prominently shortened and the manufacturing speed can be highly increased.

According to the present invention, there is attained an advantage that a draw-blow-formed heat-set hollow formed body in which the thermal contraction after absorption of the moisture is controlled to a low level can be prepared at a very high manufacturing speed.

The present invention will now be described in detail with the following examples that by no means limit the scope of the invention. Incidentally, in the examples and comparative examples given hereinafter, the characteristics of vessels were determined and evaluated according to the following methods.

(a) Intrinsic viscosity 200 mg of a sample collected from a preform or bottle was dissolved in 20 ml of a phenol/tetrachloroethane mixed solvent (1/1 weight ratio) at 105° C. for 20 minutes with stirring. The solution viscosity of the obtained solution was measured in a thermostat water tank maintained at 30° C. by a Ubellohde viscometer and the intrinsic viscosity was calculated from the solution viscosity.

Relative viscosity $\eta rel = t/to$
t: dropping time (sec) of solution
to: dropping time (sec) of solvent
Specific viscosity $\eta sp = \eta rel - 1$ $$\text{Intrinsic viscosity } (\eta) = \frac{-1 + \sqrt{1 + 4k'\eta sp}}{2k'C}$$

k': Haggins' constant (0.33)
C: solution concentration (g/100 ml) (1000)

(b) Diethylene glycol content

About 2 g of a sample collected from a preform or a bottle was precisely measured, and 10 ml of hydrazine containing an internal standard (0.02 g of 1,6-hexanediol) was added to the sample and the mixture was heated at 100° C. for 30 minutes. The obtained decomposition liquid was subjected to centrifugal separation and the liquid layer sample was analyzed by the gas chromatography to determine the diethylene glycol content. The filler used for the gas chromatography was PEG-20M.

(c) Preform temperature

Just before entrance of a heated preform into a hollow forming mold, the outer surface temperature of the central portion of the preform was detected by an infrared radiation thermometer.

(d) Temperature of blown air

The temperature of blown air was measured by a temperature sensor attached in the vicinity of a blown air outlet of a pipe of high-pressure air to be blown.

(e) Drawing speed in circumferential direction by blowing

A temperature sensor was attached in the vicinity of the central portion of the bottle barrel on the inner face of the mold and the time required for elevation of the temperature from the initiation of blowing was measured. The drawing speed was calculated by the following formula:

$$\frac{R}{r} / \Delta t$$

wherein $\Delta t$ stands for the above-mentioned time, r stands for the average radius of the preform and R stands for the distance between the central line of the bottle and the attachment position of the temperature sensor.

(f) Drawing speed in axial direction by drawing rod

The time $\Delta t'$ required for drawing in the axial direction of the preform was measured by using a proximity switch and the drawing speed in the axial direction was calculated according to the following formula:

$$\frac{H}{h} / \Delta t'$$

wherein $\Delta t'$ stands for the above-mentioned time, H stands for the average height of the drawn portion of the bottle and h stands for the average height of the drawn portion of the preform.

(g) Crystallization degree

By using an n-heptane/tetrachlorocarbon density gradient tube (supplied by Ikeda Rika), the density of a sample was measured at 20° C. From this density, the crystallization degree was calculated according to the following formula:

$$\text{Crystallization degree } Xc = \frac{\rho c}{\rho} \cdot \frac{(\rho - \rho am)}{(\rho c - \rho am)} \times 100$$

wherein $\rho$ stands for the measured density (g/cm³), $\rho am$ stands for the amorphous density (1.335 g/cm³) and $\rho c$ stands for the crystalline density (1.455 g/cm³).

(h) Refractive index

By using NaD rays as the light source, an Abbe refractometer as the refractometer and a polarizing plate, the refractive indexes nz, ny and nx in the axial, circumferential and thickness directions of a sample cut out from a bottle were measured according to the method of R. J. Samuels (Journal of Applied Polymer Science, Vol. 26, 1383 (1981)).

Incidentally, according to this method, the refractive index of the side falling in contact with the main prism can be selectively measured. The results of the measurement made on polyethylene terephthalate bottles according to this method are reported by M. Cakmak et al (ANTEC '84, p. 920).

(i) Thermal contraction

A strain gauge (supplied by Kyowa Dengyo) was attached to a measurement position either in the circumferential direction of the bottle or in the axial direction of the bottle, and the bottle was filled with hot water maintained at 88° C. After natural cooling, the contraction was measured by a static strain measuring device.

Incidentally, the formed bottle was allowed to stand still for 1 day in an atmosphere maintained at a temperature of 30° C. and a relative humidity of 80% and was then subjected to the measurement.

EXAMPLE 1

An injection-molded polyethylene terephthalate preform (having a weight of 66 g) was heated by a far infrared heater and was then biaxially draw-blown to prepare a bottle having an inner capacity of 1.5 l and a shape shown in FIG. 2 (the average thickness of the barrel was 300μ). When a sample collected from the preform was measured according to the methods described above, it was found that the intrinsic viscosity was 0.74 and the diethylene glycol content was 1.3% by weight.

Bottles obtained at various drawing speeds under conditions of a preform temperature of 106° C., a blown air temperature of 130° C., a blowing time of 3 seconds, a hot air substitution time of 3 seconds and a mold temperature of 106° C. were evaluated. The obtained results are shown in Table 1 and FIGS. 4 and 5.

TABLE 1

| Sample | Drawing Speed (100%/sec) circumferential direction | Drawing Speed (100%/sec) axial direction | Crystallization Degree (%)* | Orientation Degree Ratio (Ro)* |
|---|---|---|---|---|
| A | 6.4 | 3.8 | 33 | 0.86 |
| B | 4.6 | 2.7 | 32 | 0.93 |
| C | 4.3 | 2.3 | 28 | 0.96 |
| D | 1.5 | 0.7 | 22 | 0.99 |

Figure 4:
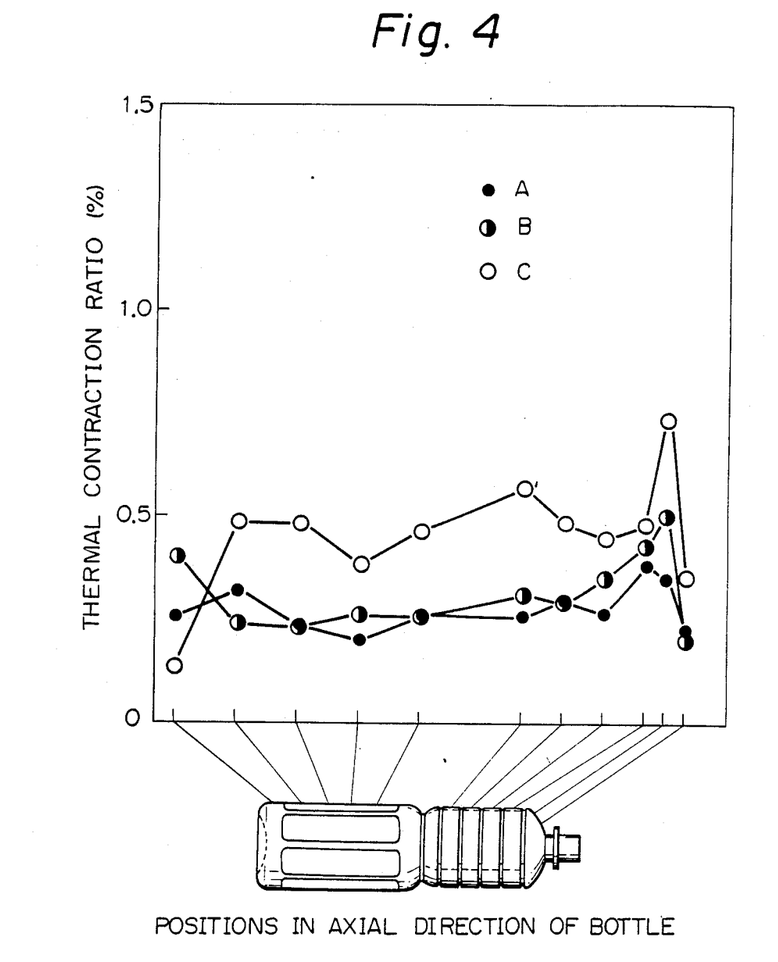
FIGS. 4 and 5 show thermal contraction ratios at various positions of the bottle.
Figure 5:
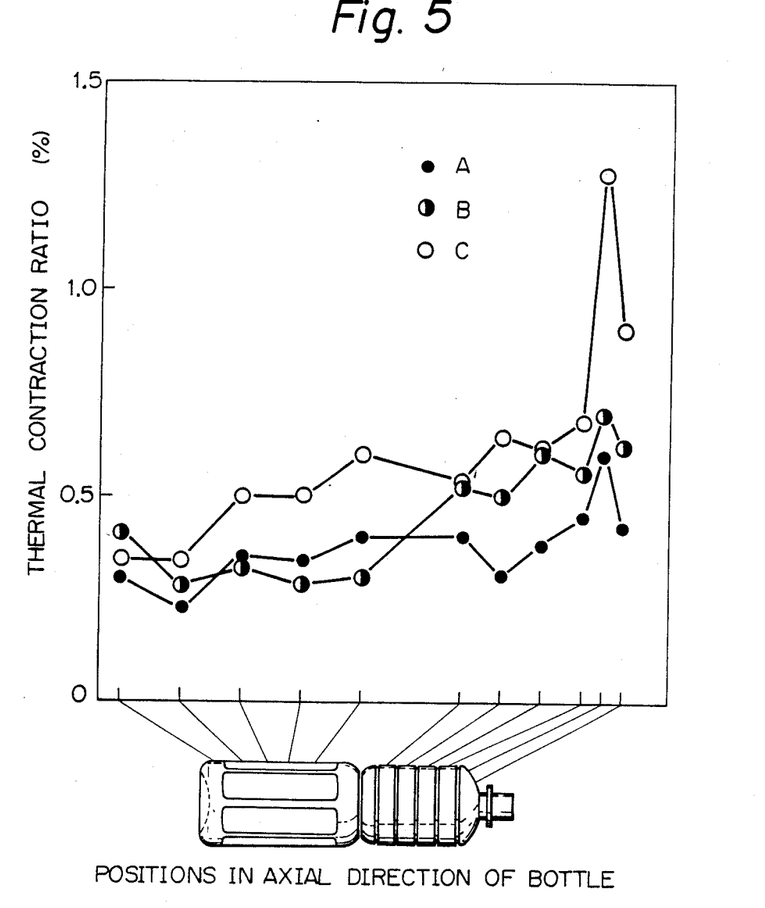

Note
*Each of the crystallization degree and the orientation degree was measured in the vicinity of the center of the shoulder where the thermal contraction was large in FIGS. 4 and 5.

In the sample D, deformation and shrinkage were large, and therefore, the contraction could not be measured.

From the foregoing results, it is seen that the higher is the drawing speed, the smaller is the thermal contraction. In case of a bottle having an inner capacity of 1.5 l, it is preferred that the contraction of the inner volume be smaller than 10 cc. For this purpose, it is necessary that the thermal contraction should be lower than 0.7%. This volume condition is satisfied in sample C, but the contraction in the vicinity of the shoulder of the bottle is large and the shape is as shown by a broken line in FIG. 2. In order to maintain the shape of the vessel even after hot filling, high-speed drawing as adopted for sample A is necessary.

In case of sample C, in order to adjust the crystallization degree of 32% for reducing the thermal contraction, a blowing time of 30 seconds was necessary. In this case, the orientation degree ratio in the vicinity of the center of the shoulder was 0.98. A time of 25 seconds was necessary for adjusting the crystallization degree of 32% in blow-formed bottle C by substitution with air maintained at 200° C. in the mold. In this case, the orientation degree ratio in the vicinity of the center of the shoulder was 0.99.

EXAMPLE 2

Bottles were prepared under the same conditions as adopted for sample A in Example 1 except that the temperature of the preform was changed as indicated in Table 2. The obtained results are shown in Table 2.

TABLE 2

| Sample | Preform Temperature (°C.) | Crystallization Degree (%)* | Orientation Degree Ratio (Ro)* | Thermal Contraction (%)* axial direction | Thermal Contraction (%)* circumferential direction | Thickness Unevenness at forming Bottle |
|---|---|---|---|---|---|---|
| E | 90 | 32 | 0.99 | measurement impossible because of too large contraction | | not caused |
| F | 95 | 32 | 0.96 | 0.8 | 1.0 | not caused |
| G | 115 | 32 | 0.83 | 0.3 | 0.5 | observed |
| A | 106 | 33 | 0.86 | 0.35 | 0.6 | not caused |

Note
*the measurement was made in the vicinity of the center of the shoulder shown in FIGS. 4 and 5

It is seen that the higher is the preform temperature, the smaller is the thermal contraction. However, in sample G, the preform was crystallized at the time of heating and the preform was somewhat whitened, and also the bottle was whitened. Furthermore, since blow-forming was carried out in the state where the preform was softened by a high temperature, thickness unevenness was readily caused (the axis of the bottle deviated from the axis of the preform). Accordingly, the thin portion of the barrel was readily deformed at the hot water filling step.

EXAMPLE 3

Bottles A and D obtained in Example 1 were stored for 1 month in an atmosphere maintained at a temperature of 30° C. and a relative humidity of 80%, and the thermal contraction with the lapse of time was determined in the following manner.

The amount (W) of water sufficiently filled in the bottle just after the formation and the amount (W') of water sufficiently filled in the bottle after the storage were measured. The temperature of filled water was 20° C. The contraction with the lapse of time was determined according to the following formula:

$$\text{Contraction (\%) with lapse of time} = \left(\frac{W - W'}{W}\right) \times 100$$

The obtained results are shown in Table 3.

TABLE 3

| Sample | Contraction (%) with Lapse of Time |
|--------|-------------------------------------|
| A      | 0.8                                 |
| D      | 6.5                                 |

From the foregoing results, it is seen that bottle A obtained according to the present invention is excellent in the resistance to contraction with the lapse of time during the storage.

We claim:

1. A heat-resistant polyester hollow formed body comprising a neck, a shoulder, a barrel and a closed bottom, wherein the center of the shoulder of the vessel is transparent and has a crystallization degree of at least 30% as measured by a density method using an n-heptane/tetrachlorocarbon density gradient tube, the refractive index (nxo) in the thickness direction of the outer face side of the center of the shoulder, measured by using NaD rays, is larger than the refractive index (nxi) in the thickness direction of the inner face side of the center of the shoulder, measured by using NaD rays, and there is formed such a molecular orientation distribution that the orientation degree ratio (Ro) defined by the following formula is less than 0.95:

$$Ro = (na - nxo)/(na - nxi)$$

wherein na is a refractive index of the unoriented polyester, which is equal to 1.5760.

2. A vessel comprising a neck, a shoulder, a barrel and a closed bottom, which is obtained by draw-blow-forming a preform of a thermoplastic polyester composed mainly of ethylene terephthalate units aand heat-setting the orientation, wherein the center of the shoulder of the vessel is transparent and has a crystallization degree (Xc), defined by the following formula, of at least 30%:

$$Xc = \frac{\rho_c}{\rho} \times \frac{(\rho - \rho am)}{(\rho c - \rho am)} \times 100$$

wherein $\rho$ stands for the measured density (g/cm$^3$), $\rho$am stands for the amorphous density (1.335 g/cm$^3$), and $\rho$c stands for the crystalline density (1.455 g/cm$^3$);

the refractive index (nxo) in the thickness direction of the outer face side of the center of the shoulder, measured by using NaD rays, is larger than the refractive index (nxi) in the thickness direction of the inner face side of the center of the shoulder, measured by using NaD rays, and there is formed such a molecule orientation distribution that the orientation degree ratio (Ro) defined by the following formula is less than 0.95:

$$Ro = (na - nxo)/(na - nxi)$$

wherein na is a refractive index of the unoriented polyester, which is equal to 1.5760.

3. A vessel as set forth in claim 2, wherein the center of the shoulder has a crystallization degree (Xc) of at least 30% and an orientation degree ratio (Ro) of from 0.75 to 0.93.

4. A vessel as in claim 2, wherein the intrinsic viscosity of the thermoplastic polyester used is at least 0.67 dl/g, said polyester further comprising diethylene glycol, wherein the content of diethylene glycol units in said polyester is lower than 2.0% by weight.

5. A heat resistant polyester hollow formed body, produced by a process which comprises mounting a preform of a thermoplastic polyester material composed mainly of ethylene terphthalate units, which is maintained at a temperature where high-speed drawing is possible but whitening can be prevented, in a hollow forming mold maintained at a temperature as high as possible within the range where a final hollow formed body can be withdrawn without deformation substantially under non-cooling, blowing air maintained at a temperature by at least 10° C. higher than the preformed temperature (T) into the preform to effect stretch drawing and expansion drawing so that the drawing speed in the circumferential direction is at least 450%/sec and the drawing speed in the axial direction is at least 250%/sec, said high speed drawing of the preform causing the temperature of the preform to raise due to heat generated by internal friction or crystallization of the polyester material during said blowing step, and thereafter effecting heat setting as the preform is being draw formed, the hollow formed body having a crystallization degree of at least 30% as measured by a density method using an n-heptane/tetrachlorocarbon density gradient tube, the refractive index (nxo) in the thickness direction of the outer face side of the center of the shoulder, measured by using NaD rays, is larger than the refractive index (nxi) in the thickness direction of the inner face side of the center of the shoulder, measured by using NaD rays, and there is formed such a molecular orientation distribution that the orientation degree ratio (Ro) defined by the following formula is less than 0.95:

$$Ro = (na - nxo)/(na - nxi)$$

wherein na is a refractive index of the unoriented polyester, which is equal to 1.5760.

* * * * *